(12) United States Patent
Seo et al.

(10) Patent No.: US 6,518,828 B2
(45) Date of Patent: Feb. 11, 2003

(54) PUMPING VOLTAGE REGULATION CIRCUIT

(75) Inventors: Sung-Whan Seo, Ichon-shi (KR); Im-Cheol Ha, Ichon-shi (KR)

(73) Assignee: Hynix Semiconductor Inc., Ichon-shi (KR)

( * ) Notice: Subject to any disclaimer, the term of this patent is extended or adjusted under 35 U.S.C. 154(b) by 0 days.

(21) Appl. No.: 10/013,529

(22) Filed: Dec. 13, 2001

(65) Prior Publication Data

US 2002/0084830 A1 Jul. 4, 2002

(30) Foreign Application Priority Data

Dec. 18, 2000 (KR) .......................................... 2000-77705

(51) Int. Cl.[7] .................................................. H03K 3/01
(52) U.S. Cl. .......................... 327/534; 327/535; 327/536
(58) Field of Search .................................. 327/534, 535, 327/536, 390, 590; 363/78, 59, 60; 365/185.03

(56) References Cited

U.S. PATENT DOCUMENTS

| | | | | |
|---|---|---|---|---|
| 5,703,807 A | * | 12/1997 | Smayling et al. ...... | 365/185.03 |
| 6,002,599 A | * | 12/1999 | Chow .......................... | 363/59 |
| 6,333,864 B1 | * | 12/2001 | Nishimura et al. ........... | 363/78 |

* cited by examiner

Primary Examiner—Tuan T. Lam
Assistant Examiner—Hiep Nguyen
(74) Attorney, Agent, or Firm—Jacobson Holman PLLC

(57) ABSTRACT

A pumping voltage regulation circuit adjusts a pumping voltage to maintain a preset voltage level regardless of the variation of a supply voltage. The pumping voltage regulation circuit includes a clock adjusting unit for producing a second clock signal according to a combination of a first clock signal and a first control signal or that of the first clock signal and a second control signal, a pumping voltage generating unit for producing a pumping voltage in response to the second clock signal outputted from the clock adjusting unit, a diode chain for dividing the pumping voltage and a sense amplifier for outputting the second control signal by comparing an output voltage of the diode chain with a reference voltage.

4 Claims, 7 Drawing Sheets

PUMPING VOLTAGE REGULATION CIRCUIT

FIELD OF THE INVENTION

The present invention relates to a pumping voltage regulation circuit; and, more particularly, to a pumping voltage regulation circuit capable of preventing a pumping voltage from being changed depending on the variation of a supply voltage by adjusting a clock signal inputted to a pumping voltage generating circuit through the use of an output signal of a sense amplifier to thereby maintain the pumping voltage to have a preset voltage level.

BACKGROUND OF THE INVENTION

A flash memory device programs or erases memory cells by using a pumping voltage whose voltage level is higher than that of a supply voltage. The pumping voltage is generated at a pumping voltage generating circuit and regulated to maintain a preset voltage level.

Referring to FIG. 1, there is described a configuration of a conventional pumping voltage regulation circuit. A conventional pumping voltage regulation method will be explained hereinafter with reference to FIG. 1.

A pumping voltage generating circuit 11 receives a clock signal CLOCK from an oscillator and produces a pumping voltage VPPI of about 9 V. This pumping voltage VPPI is used to program or erase flash memory cells. The rise of the pumping voltage VPPI is prevented by a sense amplifier 12 which is provided with a reference voltage Vref and an output voltage of a diode chain 13 consisting of a plurality of diodes connected in series and compares the two voltages supplied thereto. An output signal of the sense amplifier 12 drives an NMOS transistor N11 connected between its output node and a ground node Vss, thereby stabilizing an ascending pumping voltage VPPI. That is, when the reference voltage Vref inputted to the sense amplifier 12 is set to about 1 V, the diode chain 13 is configured to produce an output voltage of about 1 V when a normal pumping voltage of about 9 V is generated. Therefore, in this configuration, if the pumping voltage VPPI is outputted as maintaining about 9 V, the sense amplifier 12 outputs no signal and, thus, the NMOS transistor N11 is not turned on. However, since the output voltage of the diode chain 13 becomes larger than 1 V if the pumping voltage VPPI becomes higher than 9 V, the sense amplifier 12 outputs a certain voltage capable of turning on the NMOS transistor N11, so that there is made an electric path between the output node VPPI and the ground node Vss and, thus, the potential of the output node VPPI becomes lower. Through this operation, the pumping voltage VPPI can maintain the preset voltage level.

However, in the conventional pumping voltage regulation circuit, since the voltage level of the clock signal CLOCK is fixed as the supply voltage Vcc, there occurs a serious overshoot in the pumping voltage level as the supply voltage goes higher. In FIG. 2, there is shown a waveform diagram of the pumping voltage when the clock signal CLOCK having the supply voltage level is inputted to the pumping voltage regulation circuit. Further, since there is employed a method for maintaining the preset pumping voltage by discharging the higher potential than the potential outputted from the pumping voltage generating circuit to the ground node Vss, there may occur a undershoot in the pumping voltage.

Therefore, since it is impossible to produce the pumping voltage maintaining the preset voltage level when generating the pumping voltage by using the conventional circuits, it is difficult to control a threshold voltage of programming or erasing the flash memory cells and, thus, the reliability of the memory device is also deteriorated.

SUMMARY OF THE INVENTION

It is, therefore, a primary object of the present invention to provide a pumping voltage regulation circuit capable of generating a preset constant pumping voltage regardless of the variation of a supply voltage.

Another object of the present invention is to provide a pumping voltage regulation circuit for producing a pumping voltage by using a clock signal having a lower voltage level than the supply voltage.

In accordance with the present invention, there is provided a pumping voltage regulation circuit comprising:

a clock adjusting unit for producing a second clock signal according to a combination of a first clock signal and a first control signal or that of the first clock signal and a second control signal;

a pumping voltage generating unit for producing a pumping voltage in response to the second clock signal outputted from the clock adjusting unit;

a diode chain for dividing the pumping voltage; and a sense amplifier for outputting the second control signal by comparing an output voltage of the diode chain with a reference voltage.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Hereinafter, an embodiment of the present invention will be described in detail with reference to the accompanying drawings.

Figure 1:
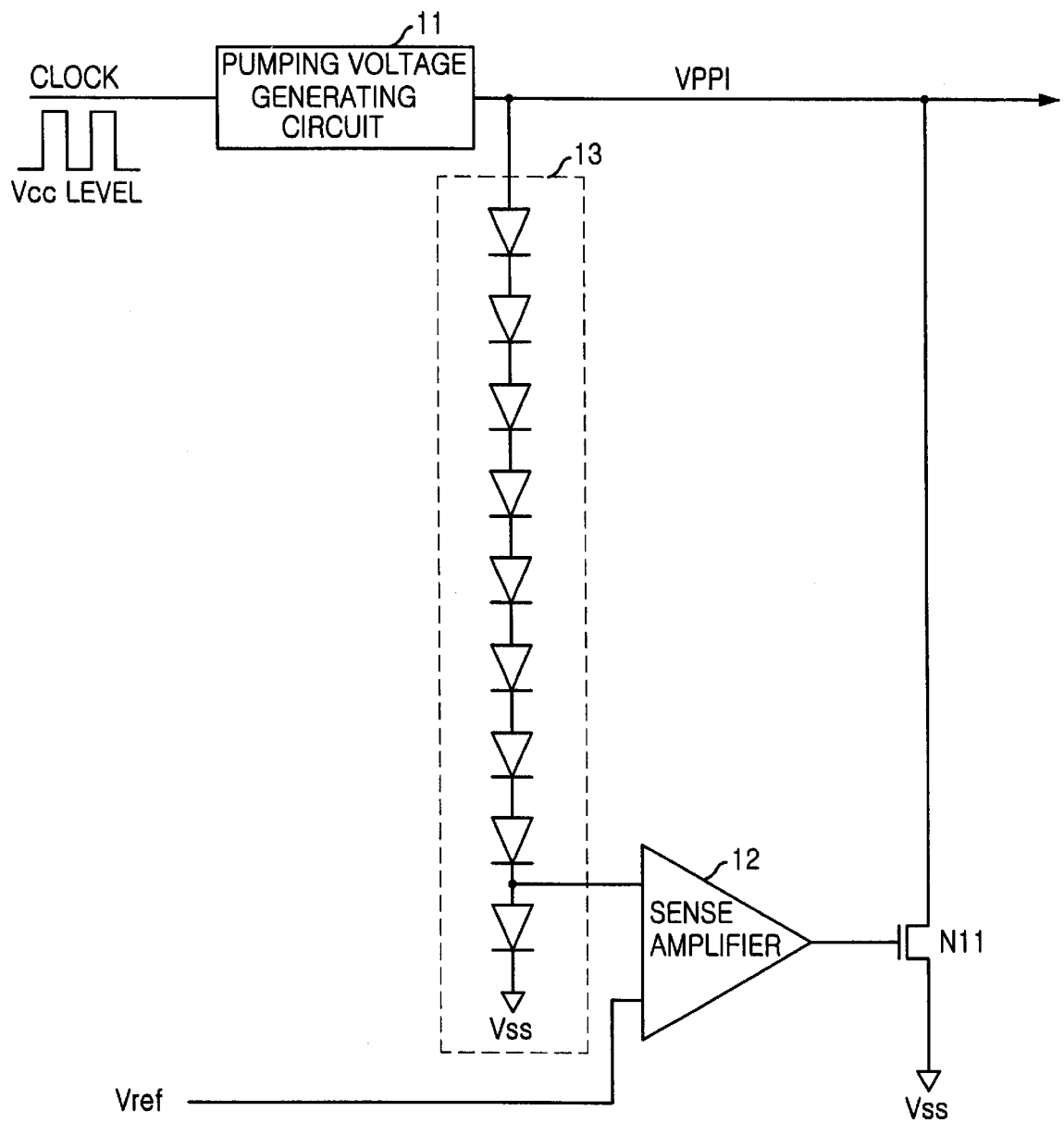
FIG. 1 shows a configuration of a conventional pumping voltage regulation circuit.
Figure 2:
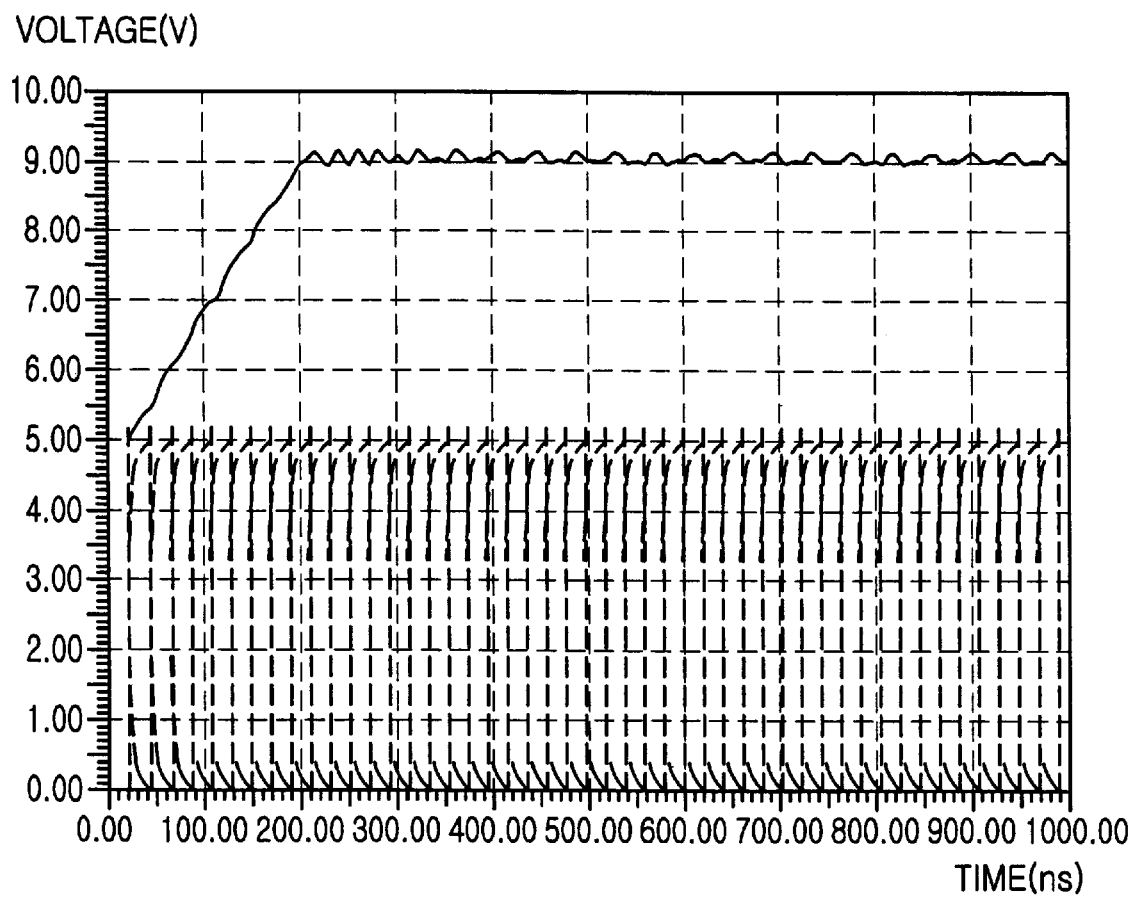
FIG. 2 describes a waveform diagram of an output voltage of the conventional pumping voltage regulation circuit.
Figure 3:
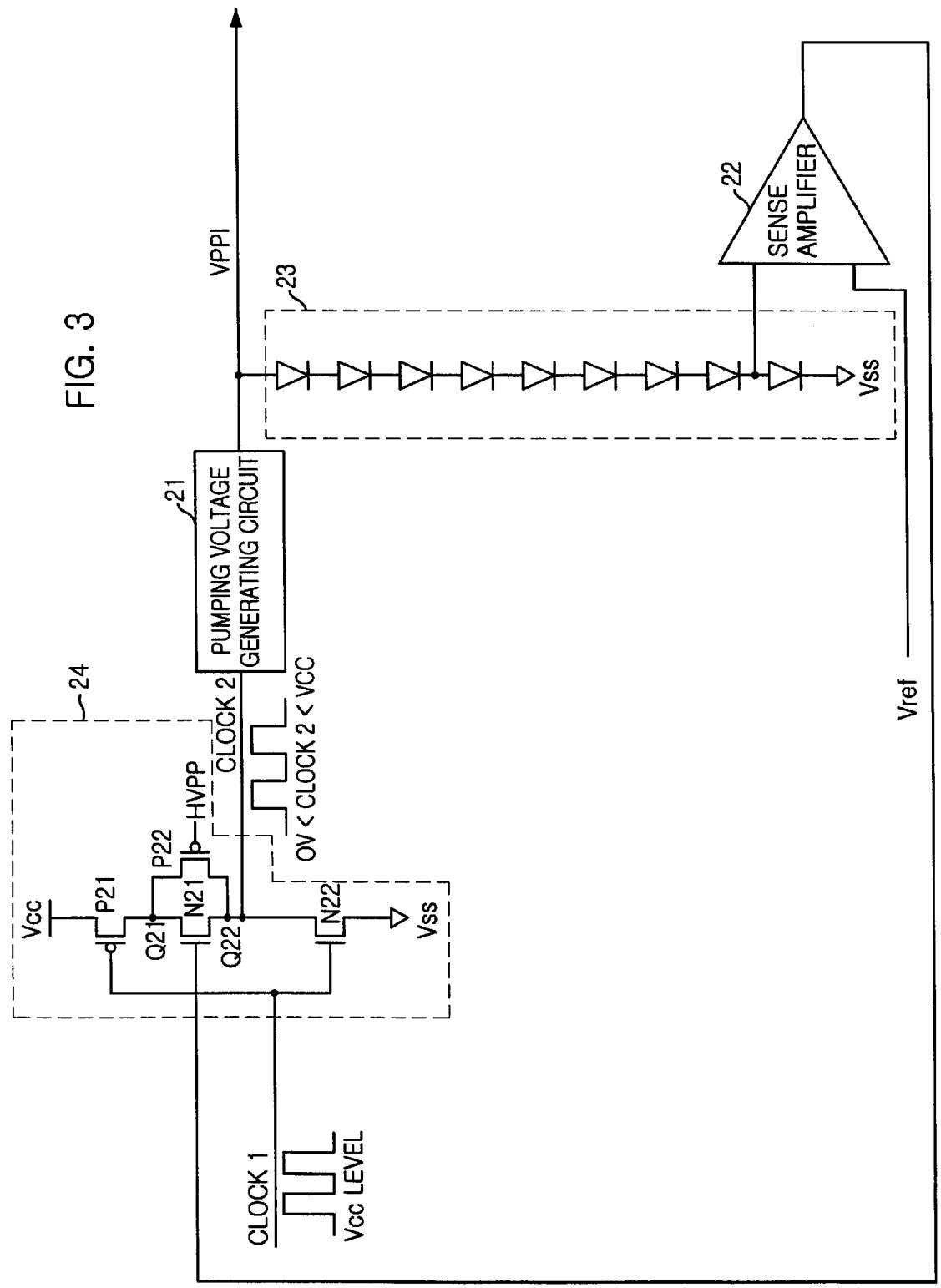
FIG. 3 provides a configuration of a pumping voltage regulation circuit in accordance with the present invention.

Referring to FIG. 3, there is provided a constitutional diagram of a pumping voltage regulation circuit in accordance with the present invention, which has a configuration described herein below.

A first PMOS transistor P21 operating under the control of a first clock signal CLOCK 1 is connected between a supply voltage node Vcc and a first node Q21. A first NMOS transistor N21 and a second PMOS transistor P22 are connected in parallel between the first node Q21 and a second node Q22. The first NMOS transistor N21 operates in response to an output signal of a sense amplifier 22 and the second PMOS transistor P22 maintains its initial low state and, then, is operated by a first voltage source HVPP which produces a given voltage when detecting that a pumping voltage VPPI is outputted. The potential of the second node Q22 is used as a second clock signal CLOCK 2. A second NMOS transistor N22, which operates in response to the first clock signal CLOCK 1, is connected between the second node Q22 and the ground node Vss. A clock adjusting unit 24 is constructed by this transistor configuration.

A pumping voltage generating circuit 21 produces the pumping voltage VPPI in response to the second clock signal CLOCK 2.

The sense amplifier 22 receives a reference voltage Vref predetermined as about 1 V and an output voltage of a diode chain 23 consisting of a plurality of diodes connected in series to divide the pumping voltage VPPI to a certain voltage level and compares the received two voltages to thereby generate a comparison signal. The comparison signal is inputted to a gate of the first NMOS transistor N21 and used to drive the first NMOS transistor N21.

Hereinafter, there will be described a method for operating the pumping voltage regulation circuit in accordance with the present invention.

When the first clock signal CLOCK 1 having a Vcc level is inputted, the first PMOS transistor P21 is turned on when the first clock signal CLOCK 1 has a low state and, therefore, the supply voltage Vcc is provided to the first node Q21. At this time, since the pumping voltage VPPI is not outputted yet and the first voltage source HVPP maintains a low state, the second PMOS transistor P22 is turned on. Accordingly, the supply voltage Vcc is provided to the second node Q22 and the potential Vcc of the second node Q22 is used as the second clock signal CLOCK 2.

The pumping voltage generating circuit 21 receives the second clock signal CLOCK 2 having the supply voltage Vcc as an input and outputs the pumping voltage VPPI of about 9 V.

The sense amplifier 22 is provided with the output voltage of the diode chain 23 and the reference voltage Vref, compares the two voltages and outputs the comparison signal according to the comparison result. If the pumping voltage VPPI rises according to the ascending supply voltage Vcc, the output voltage of the diode chain 23 becomes larger than the certain voltage. As a result, the sense amplifier 22 generates the comparison signal having a high state, resulting in turning on the first NMOS transistor N21 of the clock adjusting unit 24. At this time, the first voltage source HVPP becomes to have a high state since it detects that the pumping voltage VPPI is outputted, so that the second PMOS transistor P22 is turned off.

In the meantime, the potential of the comparison signal is determined by the operation of the sense amplifier 22 and has an intermediate level of 0 V and the Vcc. Therefore, the voltage coupled to the second node Q22 has the potential lower than the supply voltage Vcc. That is, the pumping voltage VPPI is outputted by the second clock signal CLOCK 2 having a voltage level lower than the supply voltage Vcc.

Figure 5:
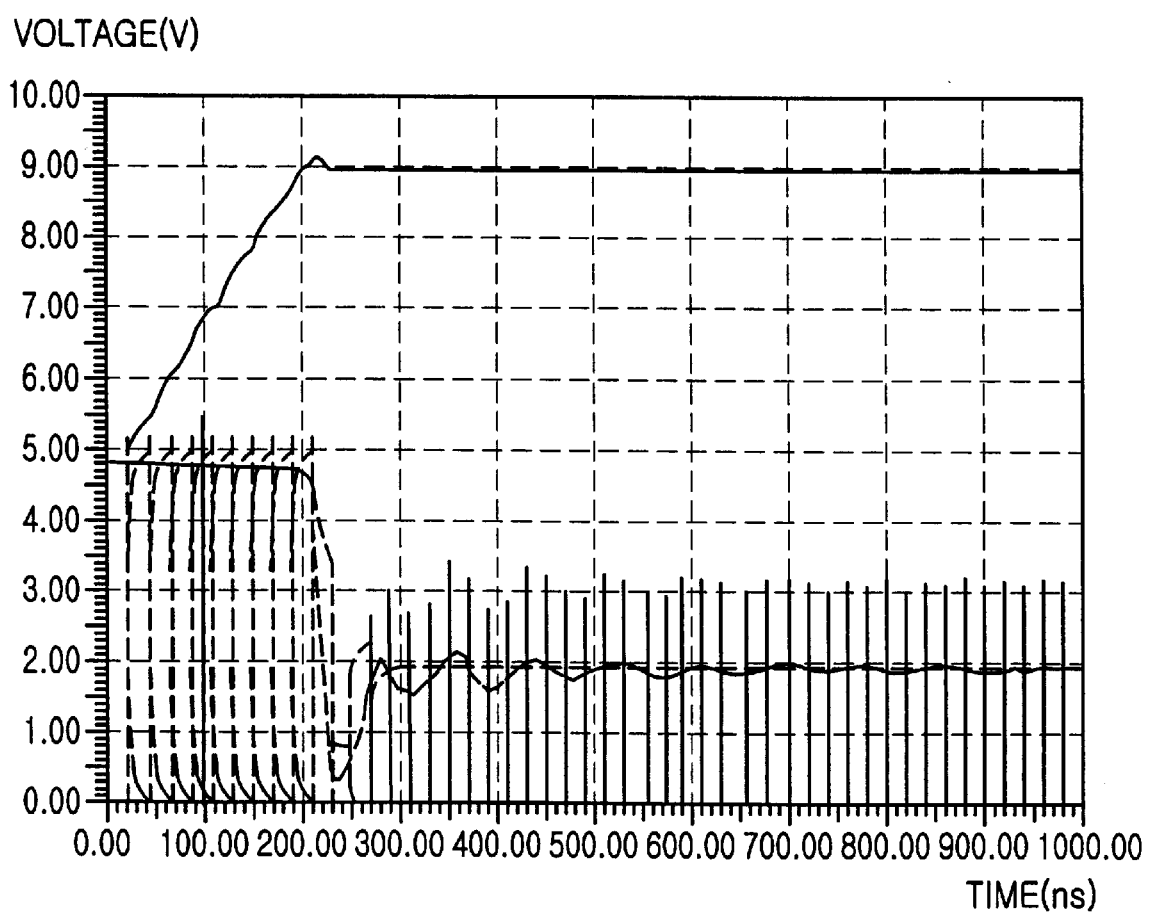
FIG. 5 represents a waveform diagram of an output voltage of the pumping voltage regulation circuit in accordance with the present invention.

In FIG. 5, there is shown a waveform diagram of the pumping voltage depending on the second clock signal CLOCK 2 varying as described above. As illustrated in FIG. 5, the pumping voltage is outputted without a ripple.

In order to maintain the comparison signal outputted from the sense amplifier to have a voltage level lower than the supply voltage Vcc as depicted above, it is required to reduce a gain of the sense amplifier.

Figure 4:
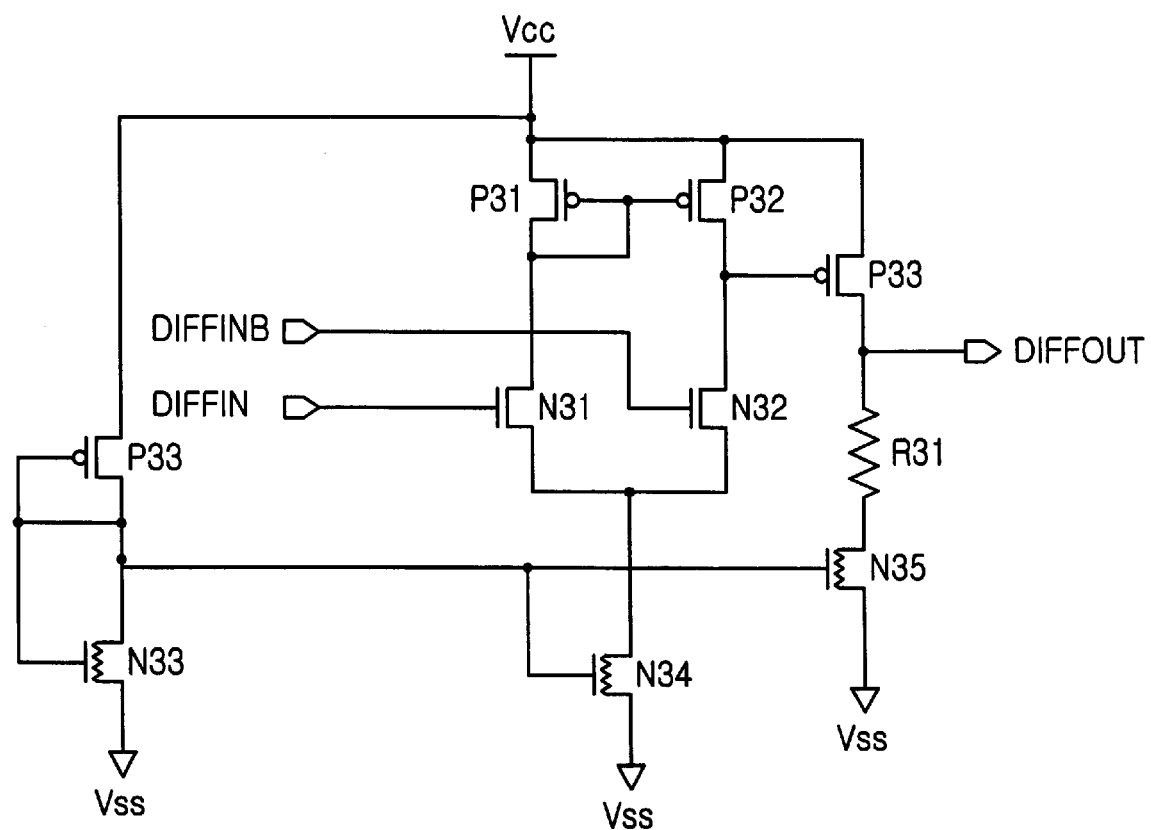
FIG. 4 is a circuit diagram of a sense amplifier applied to the pumping voltage regulation circuit in accordance with the present invention.

Referring to FIG. 4, there is provided a configuration of the sense amplifier, which includes a first and a second NMOS transistor N31 and N32 whose threshold voltage is 0 V and further employs an output load, e.g., a resistor R31, at its output node DIFFOUT compared with a conventional sense amplifier, thereby reducing its gain, wherein input signals are coupled to input nodes DIFFIN and DIFFINB, i.e., gates of the first and the second NMOS transistor N31 and N32, respectively.

Figure 6:
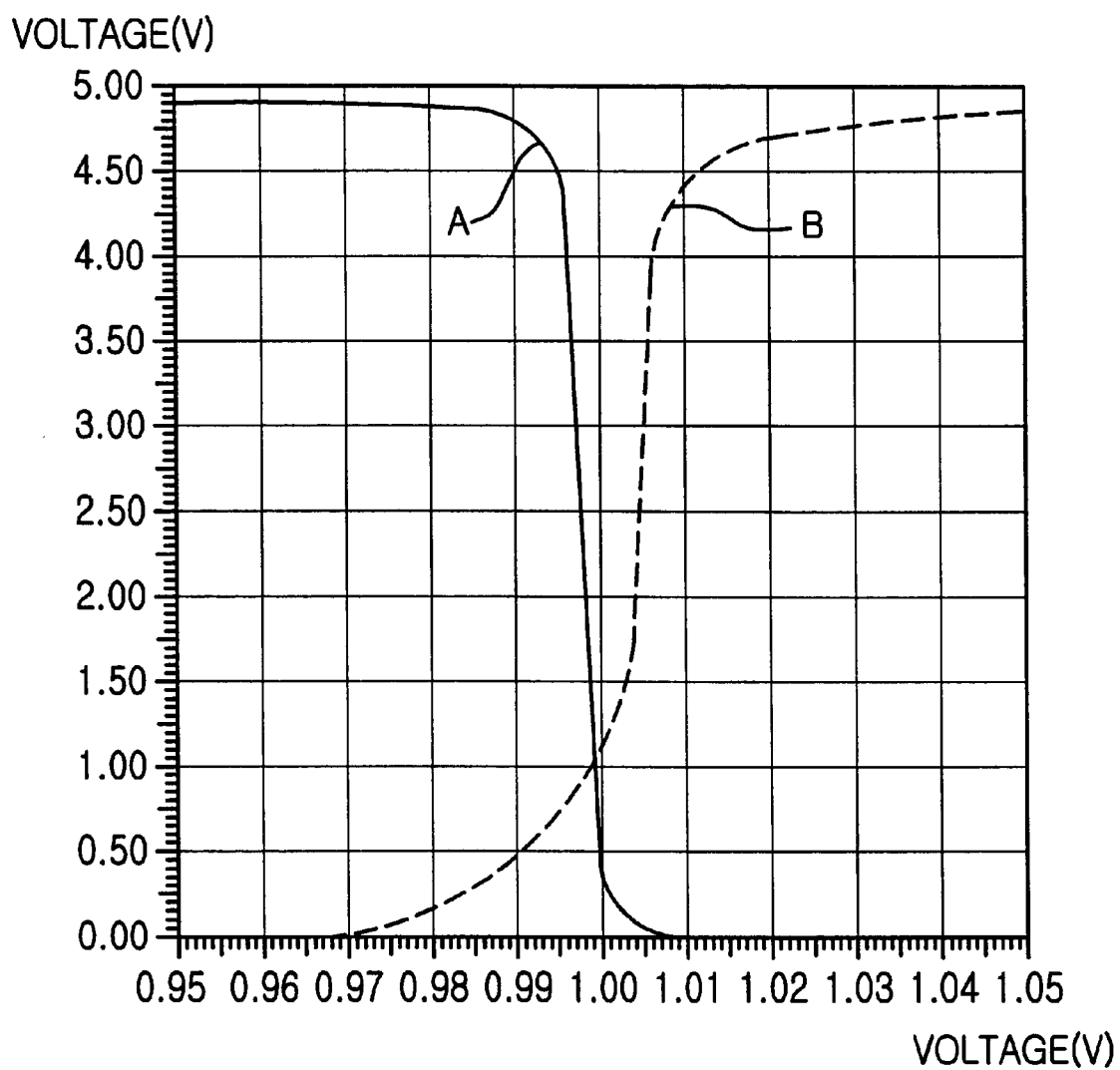
FIG. 6 illustrates a waveform diagram of gains of sense amplifiers in accordance with the prior art and the present invention.

Referring to FIG. 6, there are shown a gain A of a conventional sense amplifier having a high gain and a gain B of the inventive sense amplifier having a low gain. From FIG. 6, it is noticed that the gain variation of the inventive sense amplifier is smaller than that of the conventional sense amplifier.

Figure 7:
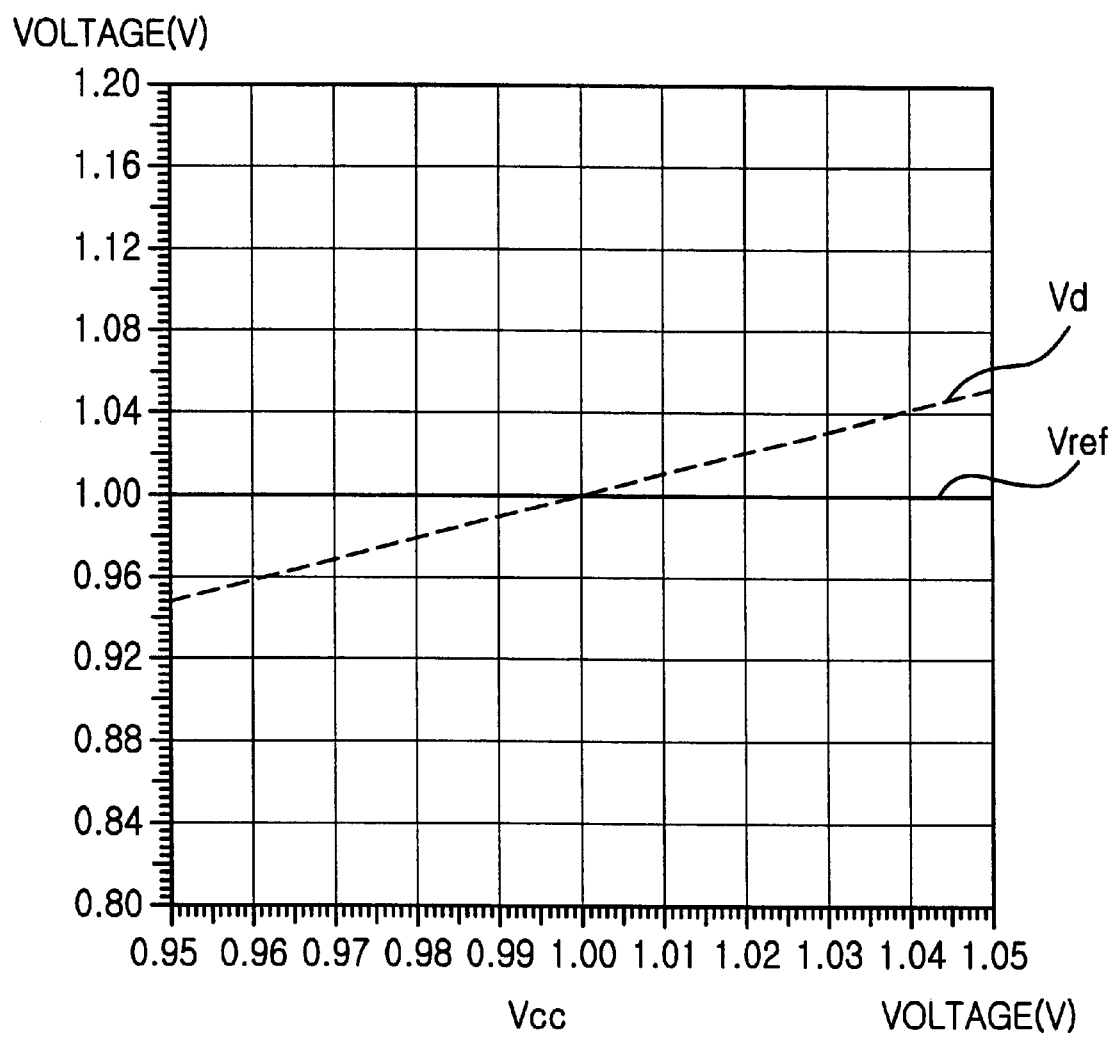
FIG. 7 depicts a graph showing a reference voltage and an output voltage of a diode chain.

Referring to FIG. 7, there is depicted a graph showing a comparison result of the reference voltage Vref having the constant predetermined voltage level, e.g., 1 V, and the output voltage Vd of the diode chain varying depending on the supply voltage Vcc. As shown in FIG. 7, the output voltage Vd of the diode chain rises as the supply voltage Vcc ascends.

As described above, in accordance with the present invention, by adjusting the clock signal inputted to the pumping voltage generating circuit through the use of the comparison signal outputted from the sense amplifier for maintaining the pumping voltage to have the preset voltage level, it is possible to prevent the pumping voltage from being changed according to the variation of the supply voltage Vcc and to improve the reliability of the memory devices.

While the present invention has been described with respect to the particular embodiments, it will be apparent to those skilled in the art that various changes and modifications may be made without departing from the spirit and scope of the invention as defined in the following claims.

What is claimed is:

1. A pumping voltage regulation circuit comprising:
   clock adjusting means for producing a second clock signal according to a combination of a first clock signal, a first control signal and a second control signal;
   pumping voltage generating means for producing a pumping voltage in response to the second clock signal outputted from the clock adjusting means;
   a diode chain for dividing the pumping voltage; and
   a sense amplifier for outputting the second control signal by comparing an output voltage of the diode chain with a reference voltage.

2. The pumping voltage regulation circuit as recited in claim 1, wherein the clock adjusting means includes:
   a first PMOS transistor connected between a supply voltage node and a first node and operating in response to the first clock signal;
   a second PMOS transistor connected between the first node and a second node and operating under the control of the first control signal;
   a first NMOS transistor connected between the first node and the second node and operating under the control of the second control signal; and
   a second NMOS transistor connected between the second node and a ground node and operating in response to the first clock signal.

3. The pumping voltage regulation circuit as recited in claim 1, wherein the sense amplifier includes input loads which senses a voltage difference of input signals coupled thereto and an output load connected to its output node, the input loads employing transistors whose threshold voltage is 0 V.

4. The pumping voltage regulation circuit as recited in claim 3, wherein the output load contains at least one resistor.

\* \* \* \* \*